Sept. 17, 1968 A. W. FRIEND 3,402,317

TELEVISION HORIZONTAL DEFLECTION AND HIGH VOLTAGE SYSTEM

Filed Aug. 9, 1963 5 Sheets-Sheet 1

INVENTOR
ALBERT W. FRIEND

BY Hall, Pollock & Vande Sande

ATTORNEY

INVENTOR
ALBERT W. FRIEND

BY Hall, Pollock & Vande Sande
ATTORNEY

INVENTOR
ALBERT W. FRIEND

BY Hall, Pollock & Vande Sande
ATTORNEY

INVENTOR
ALBERT W. FRIEND

BY Hall, Pollock & Vande Sande
ATTORNEY

INVENTOR
ALBERT W. FRIEND
BY Hall, Pollock & Vande Sande
ATTORNEY

United States Patent Office 3,402,317
Patented Sept. 17, 1968

3,402,317
TELEVISION HORIZONTAL DEFLECTION AND HIGH VOLTAGE SYSTEM

Albert W. Friend, 5903 City Line Ave., Philadelphia, Pa. 19131
Filed Aug. 9, 1963, Ser. No. 301,119
13 Claims. (Cl. 315—22)

This invention relates to a novel electronic circuit and to a vacuum tube which combines, within a single vacuum envelope, the vacuum tube functions of horizontal deflection output amplifier, damper diode (or triode) and high-voltage rectifier diode. It permits a degree of compactness heretofore unknown in low cost television receivers in the deflection and high voltage part of the unit. The new arrangements of circuits and components of this receiving system add to the simplicity and reduce to a minimum the number of component parts, terminals, and wires which must operate at high voltage levels.

In the past it has been customary to use separate tubes for the horizontal deflection output amplifier, the damper and the high voltage rectifier. This division of the circuit among these separate tubes has resulted in the necessity to insulate the entire high voltage rectifier tube and many components to withstand up to 20 kv., or more with respect to ground (chassis) and other components.

An object of this invention is to avoid the aforementioned difficulties of the prior art.

A very important object of the invention is to reduce the costs of the circuits and components which are used to act upon the cathode ray picture tube of a television receiver.

Still another important object of the invention is to provide a single tube which combines the functions of the horizontal deflection output amplifier tube, the damper tube, and the high voltage rectifier tube, and a circuit for the application of that tube.

Still another important object of the invention is to provide a beam pentode for the amplification of the horizontal deflection wave, a diode (or triode) damper, and a third separate heater and cathode to complete a diode rectifier for the high voltage in combination with the anode also used for the beam pentode horizontal deflection amplifier portion. These elements are all in one envelope which separates and insulates the interconnected high voltage level electrodes from the relatively low voltage elements.

It is an additional object of the invention to provide an improved circuit for a cathode ray picture tube to be used in a television receiving system.

Other objects of the invention will appear as this description proceeds.

In carrying out the aforesaid objects, I provide a vacuum tube, contained in a single envelope, having a plurality of elements including a first anode and a first cathode for the horizontal sawtooth sweep circuit of the cathode ray tube. These elements, except for the said first anode and a second cathode for the damper portion (connected to the first anode) operate at a low voltage and may have terminals in the form of a standard low voltage socket mounted upon the customary chassis. The said connected anode and cathod may also be connected to an isolated pin upon the same base, if its peak voltage is limited to match the insulation. The tube also contains a third heater and a third cathode to form, with the first anode, a high voltage rectifier section. This third heater and third cathode constitute the high voltage elements. They are connected to the tube-top terminals. This combination of the various tube functions within a single envelope reduces the necessary number of terminals, sockets and mountings, and particularly reduces the number of separate high voltage mounting points, thus reducing the cost and complexity, and increasing the reliability of the system.

Figure 1:
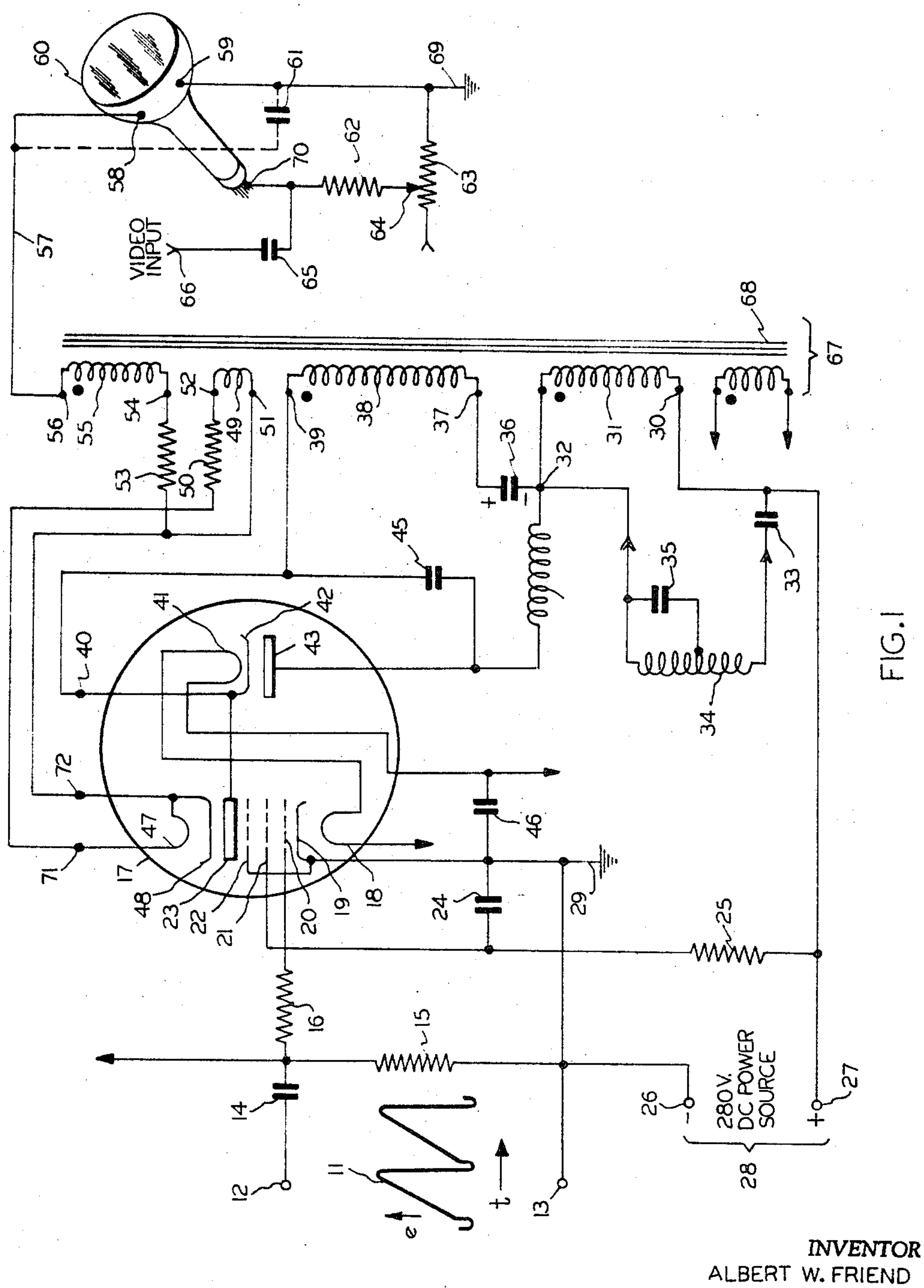
FIGURE 1 is a schematic drawing of one possible arrangement of the invention.

In the schematic diagram of FIGURE 1, an input sawtooth wave 11 is applied between terminals 12 and 13. It passes through series capacitor 14 and appears across grid shunting resistor 15. Tube 17 contains, among other elements, a first heater element 18 within a cathode 19, and spaced about that cathode a control grid 20, a screen grid 21, a suppressor grid 22 and a first anode 23. The input signal voltage wave 11 is transferred through small series resistor 16, and it appears across the terminals of tube 17 which are connected to control grid 20 and cathode 19.

Resistor 15 is of very large resistance value as compared with resistor 16. When voltage wave 11 causes grid 20 to become slightly positive with respect to cathode 19, at the positive peaks of wave 11, a rectified current flows from cathode 19 through resistors 15 and 16 to grid 20. This produces a voltage drop across resistor 15 which charges capacitor 14. The time constant (RC) of resistor 15 and capacitor 14 is large compared with the period of the sawtooth wave, so the integrated charge upon capacitor 14 produces essentially a small DC discharge current through resistor 15 and hence a negative DC bias on grid 20, with respect to cathode 19.

Whenever the input sawtooth voltage wave 11 swings sufficiently positive to exceed the grid basis cut-off value it causes the control grid 20 to permit a current flow in the circuit between cathode 19 and anode 23, of essentially the wave form shown in FIGURE 2*a*, in the time interval between points 81 and 83.

In tube 17 of FIGURE 1 suppressor grid 22 is shown to be connected internally to cathode 19, but it is not limited to this connection. It is within the spirit of this invention that suppressor grid 22 be terminated at a separate connector pin, and that it be connected externally to a low voltage source. This source could be of a slightly positive potential with respect to the cathode to minimize electron oscillations within the tube. The internal connection is indicated here as a matter of economy.

The screen grid 21 as shown, in FIGURE 1, is by-passed by capacitor 24 to cathode 10. Series resistor 25 is a voltage dropping resistor connected between the DC power supply source 28, via B+ terminal 27, and the screen grid 21 terminal of tube 17. The return path is via cathode 19 to terminal 26 of source 28.

When current 81 to 83, of FIGURE 2*a*, flows from cathode 19 via power supply 28 (terminals 26 and 27), it passes terminal point 30 through the first primary coil section 31 to terminal 32, and also partly via blocking capacitor 33 and horizontal deflection yoke coils 34 (with partially shunting small capacitor 35) to point 32. From there it passes via B-boost storage capacitor 36 to terminal 37 of the second primary coil section 38, to terminal 39, and thence via common vacuum tube terminal 40 to first anode 23 of vacuum tube 17.

Figure 2:
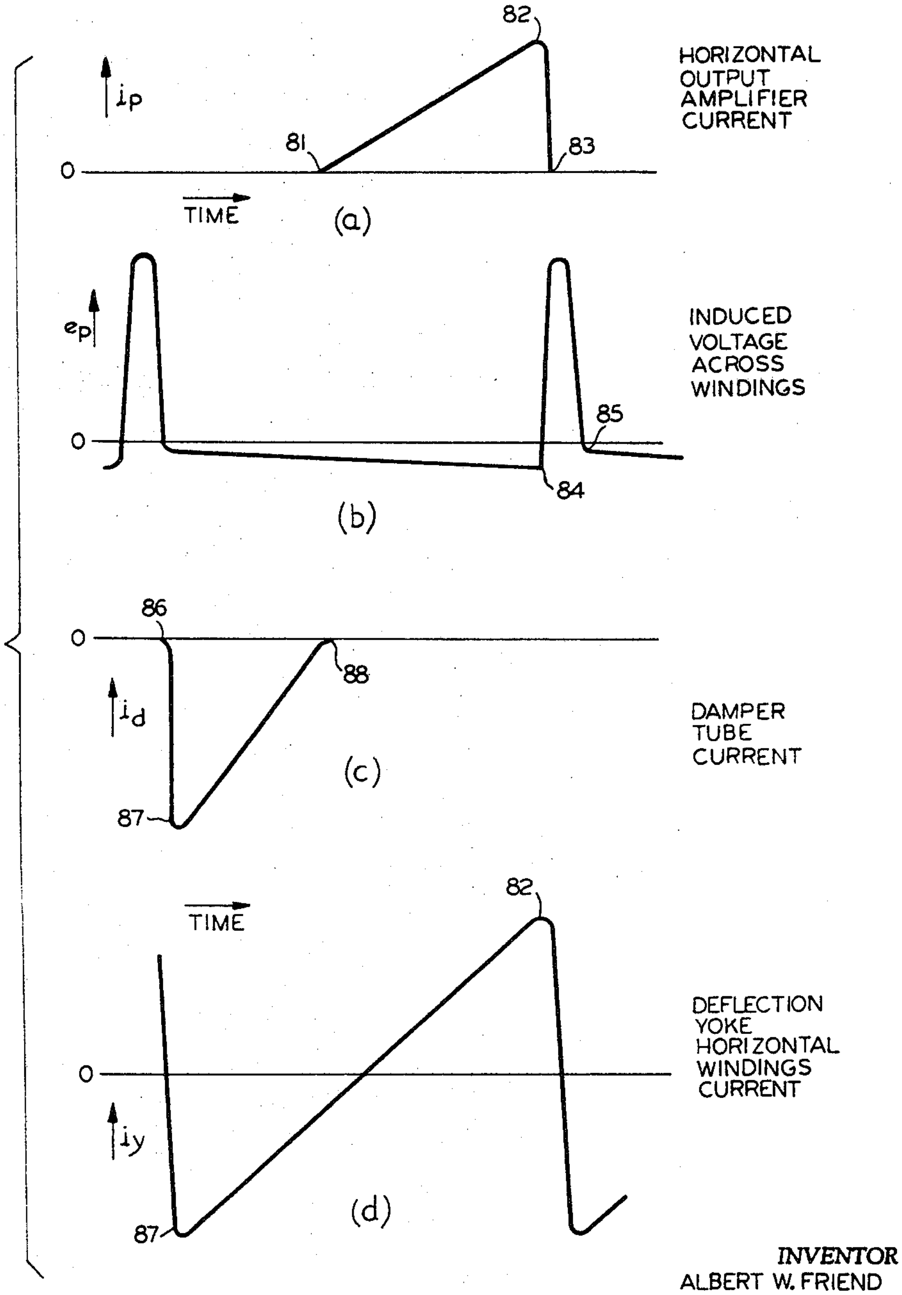
FIGURE 2 is a group of plots of current and voltage waveforms which appear at points in the circuit of FIGURE 1.

When the horizontal output amplifier current reaches its peak value 82, of FIGURE 2, it is quickly cut-off by the sudden decrease of voltage (of waveform 11) between cathode 20 and anode 19, of tube 17. As this current falls to zero at point 83, the decrease of magnetic flux in the fields of all of the coils induces a pulse of voltage which initiates a damped wave oscillation. The first alternation of this damped wave is the pulse of voltage shown in FIGURE 2*b*, between points 84 and 85. This pulse voltage is positive (+) at the coil terminals marked by a large dot (◉) in FIGURE 1.

During the pulse period, 84 to 85, terminal 32 is positive with respect to terminal 30, terminal 39 is positive with respect to terminal 37, and terminal 56 is positive with respect to terminal 54. These three sections of winding are connected in series aiding polarity through capacitor 36, the diode elements (anode 23 and cathode 48) of vacuum tube 17, and resistor 53. The circuit is completed through internal storage capacitor 61 of cathode ray picture tube 60, ground terminals 69 and 29 and power supply 28 (terminals 26 and 27). The added voltages of coils 31, 38 and 55 are thus applied in this circuit, and the pulses (84 to 85) of FIGURE 2*b* are rectified by diode elements 23 and 48, to charge capacitor 61. The DC voltage thus developed across capacitor 61 is of the order of 14 to 18 kv., or more.

Anode 23 is thus utilized for two separate purposes. During the period 81 to 83 it serves as an output amplifier, and during the period 84 to 85 it serves as the anode of a high voltage rectifier diode, a part of vacuum tube 17.

The damped oscillation begun by pulse 84 to 85 of FIGURE 2*b* is excited jointly in the coupled and interconnected inductances of transformer windings 31, 38 and 55, and deflection yoke 34, in combination with all of the associated capacitors 33, 35, 36, 45 and 61, and the distributed capacitances associated with these coils and with all of the components connected to them. The second alternation begins just as the first one ends, at time 85. Almost immediately the diode (or triode) damper begins to conduct (at 86) and changes the circuit to the more than critically damped condition, thus producing the sawtooth discharge current between points 86 and 88, of FIGURE 2*c*.

The damper diode, also within vacuum tube envelope 17 is composed of heater 41, cathode 42 and anode 43. A control grid (not shown) may be added, if desired, between cathode 42 and anode 43, to improve the linearity of the electron beam trace produced by the discharge of stored energy during the time interval indicated between points 87 and 88. When the diode is used coil 44 and capacitor 45 are adjusted to produce best linearity of the scan upon the face of cathode ray tube 60.

The damper pulse current flows from cathode 42 via terminals 40 and 39, winding 38 of transformer 67 (with core 68), terminal 37, B-boost capacitor 36, coil 44, and anode 43 of tube 17.

The DC component flows from power supply 28 via terminal 27, terminal 30, primary winding 31, terminal 32, coil 44, anode 43, cathode 42, anode 23, cathode 19, and terminal 26 of the power supply 28.

The DC path of the high voltage is from ground terminal 29 via power supply 28 (terminals 26 and 27), terminal 30, winding 31, terminal 32, coil 44, anode 43, cathode 42, anode 23, cathode 48, resistor 53, terminal 54, winding 55, terminal 56, high voltage lead 57, final anode terminal 58 to cathode 70 of cathode ray tube 60, and via series connected cathode resistors 62 and 63 to ground (chassis) terminal 69.

FIGURE 2*d* is a plot of essentially the current wave which flows in the horizontal deflection windings of the deflection yoke. It combines the coupled input currents shown by FIGURES 2*a* and 2*c* into a single sawtooth current wave.

Heater 47 of tube 17 is excited by secondary winding 49, with terminals 51 and 52, through small series voltage-dropping, resistor 50. The heater terminals at tube 17 are 71 and 72, wherein 72 is also the terminal of cathode 48. All unmarked terminals of FIGURE 1 lead to other parts of the television receiver.

Figure 3:
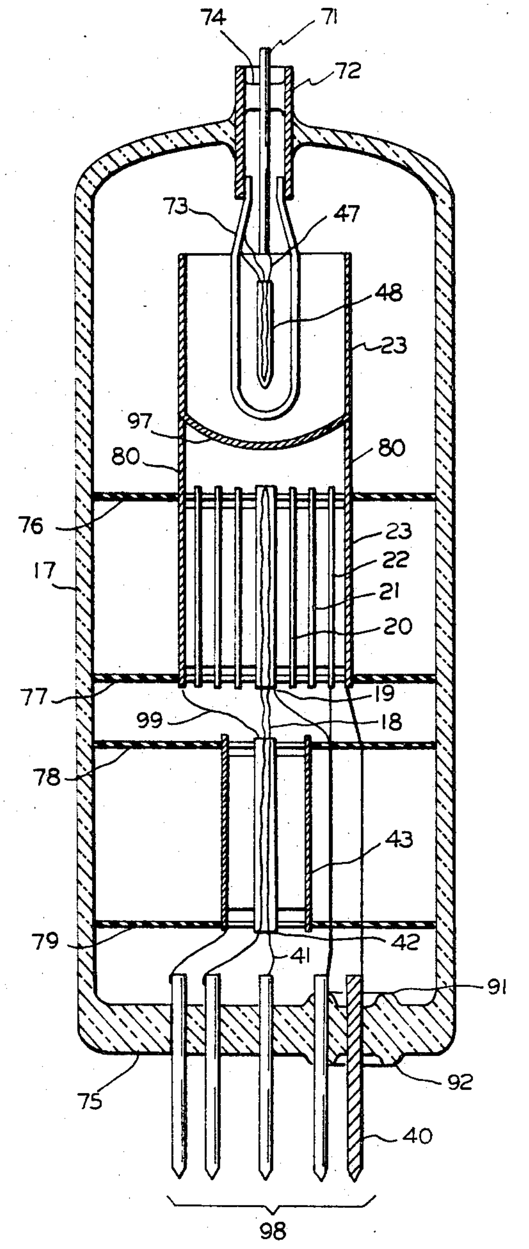
FIGURE 3 is an axial section drawing of a possible arrangement and assembly of the elements of multifunction tube 17 of FIGURE 1.

Vacuum tube 17 combines the horizontal deflection output amplifier (elements 18, 19, 20, 21, 22 and 23), the high voltage rectifier diode (elements 23, 47 and 48) and the damper (elements 41, 42 and 43) in an advantageous manner. The low voltage connected elements, 18, 19, 20, 21, 22, 41 and 43, and the medium pulse voltage level connected elements 23, 42 and 43 are connected to the base terminal pins. These mate with and mount upon a standard, low-cost, socket on the customary chassis. The high voltage elements 47 and 48 are mounted upon terminals 71 and 72, respectively, sealed into the top of the envelope. They are thereby insulated from the base connections by the insulating envelope of the tube 17. Terminal 40 of anode 23 and cathode 42 are subjected to pulses of the order of 5 kv. The terminals 71 and 72 of elements 47 and 48 must withstand the constant DC and the pulses of the high voltage power supply system of the order of +12 to 18 kv. A possible envelope and internal structure arrangement is shown in FIGURE 3. The top terminals 72 and 71 of cathode 48 and heater 47 are shown in coaxial arrangement, to permit minimization of corona effects.

The base terminals are made in the configuration of a multi-terminal button stem connector with pins omitted adjacent to terminal 40, which is subjected to moderate pulse voltages of the order of 5 to 6 kv. Insulation is provided internally between heater 41 and cathode 42 to withstand such pulse voltages, when cathode 42 is pulsed positive with respect to heater 41.

The external terminal of heater 41 may be bypassed to ground (chassis) by a capacitor 46, FIGURE 1, to minimize pulse coupling by capacitance to the cathodes of other tubes when their heaters are connected to a common source of power (possibly in series). Heaters 18 and 41 are shown in internal series connection in tube 17 of FIGURE 1, but this is optional. They may be connected in parallel, or connected entirely separately if a sufficient number of terminal pins is made available.

Figure 4:
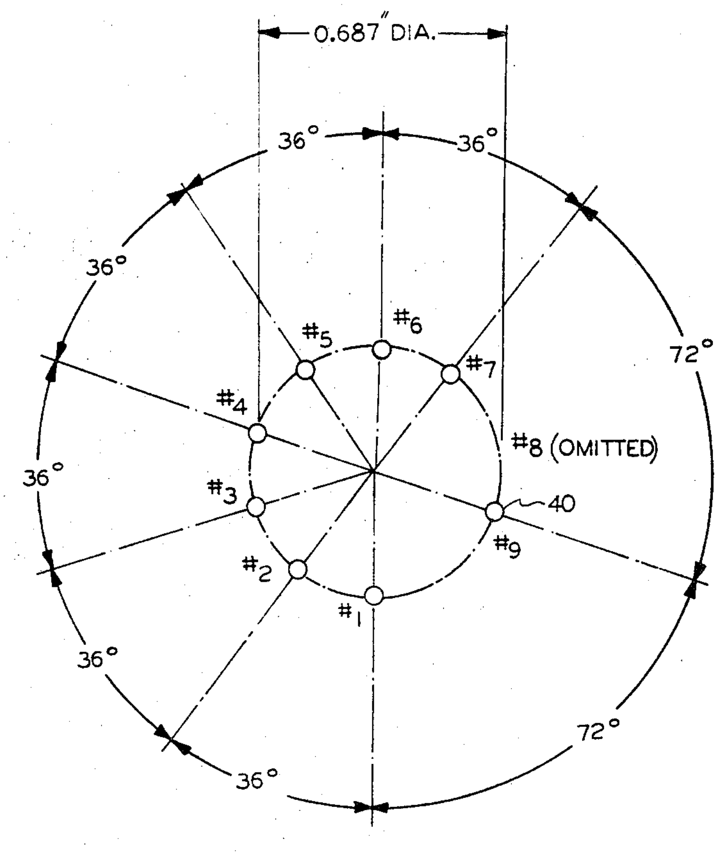
FIGURE 4 is an example of an arrangement of a standard nine pin tube base, with one pin omitted.

A nine pin "Novar" base of "small" (JEDEC No. E9–75) or "large" (JEDEC No. E9–76) configuration, similar to that of FIGURE 4 may be utilized, for example, with terminal 40 of FIGURE 1 connected to pin number 9 (with pin 8 omitted), to provide adequate pin spacing to withstand the pulse voltage.[1]

It is recommended that insulating ridges 91 and 92, respectively, be moulded or otherwise formed upon the inside and outside (upper and lower) surfaces of the terminal insulating button 90, as shown in FIGURE 3, in order to increase the surface path length between terminal 40 (pin 9 of FIGURE 4) and adjacent pins (1 and 7 of FIGURE 4), and thereby to increase the high voltage rating of pin 9 (terminal 40).

Alternately, anode 23 and cathode 42 may be brought out *separately* to two adjacent pins, so that cathode 42 may be connected to a lower voltage tap (not shown) upon winding 38 of FIGURE 1.

The basic principle of this invention is to provide a circuit, as shown in FIGURE 1, in which a single vacuum tube 17 can serve as horizontal deflection output amplifier, damper and high voltage rectifier with just three necessary high voltage insulated terminal areas: (a) the tube 17 top terminal connections, (b) the horizontal deflection transformer 67 high voltage insulated windings 49 and 55 and the cathode ray picture tube 60 final anode connection 58. These are connected together by simple insulated wire leads with no extra insulated tie points, or support points, required. The very small resistors 50 and 51 may be mounted upon the high voltage winding terminals or in the connector for the top terminals of tube 17, as desired. There are no other high voltage level components required.

[1] Reference: RCA Electron Tube Handbook, HB-3, Sheet 18B, 7–61, "Bases, 9-Pin Types."

The possible structural arrangement of tube 17, as shown by FIGURE 3, has an envelope 17 of insulating material such as glass or ceramic, a button terminal base 75, with connection pins 98, and a coaxial top terminal pair 71 and 72 (a pair of pins could be used as 71 and 72). Base 75 has insulation barriers 91 and 92.

The lowest element group, as shown in FIGURE 3, is composed of heater 41, second cathode 42 and second anode 43, all of which serve together as the damper portion. These elements are mounted between insulating spacers (mica sheets) 78 and 79.

Conducting tab 99 connects second cathode 43 to first anode 23. Inside the lower portion of anode 23 is heater 18, first cathode 19, control grid 20, screen grid 21 and beam forming electrodes or suppressor grid 22. All of these elements are supported between insulating spacers (mica sheets) 76 and 77. These elements serve together as the horizontal deflection output amplifier portion.

"Ears," tabs or wires 80 extend from the lower portion of anode 23 to the upper portion of anode 23, a metal cup, or cylinder, with lower end closure 97. Anode 23/97, with the enclosed cathode 48 and its heater 47 forms the high voltage diode rectifier portion, the elements 48 and 47 being suspended by wires 73 and 71. Wire 73 is supported by tubular outside terminal 72, within which central pin 71 is supported by insulating vacuum seal element 74. Terminal 72 is fused into vacuum envelope 17, which serves as an insulating support pillar for terminals 71 and 72.

Figure 5:
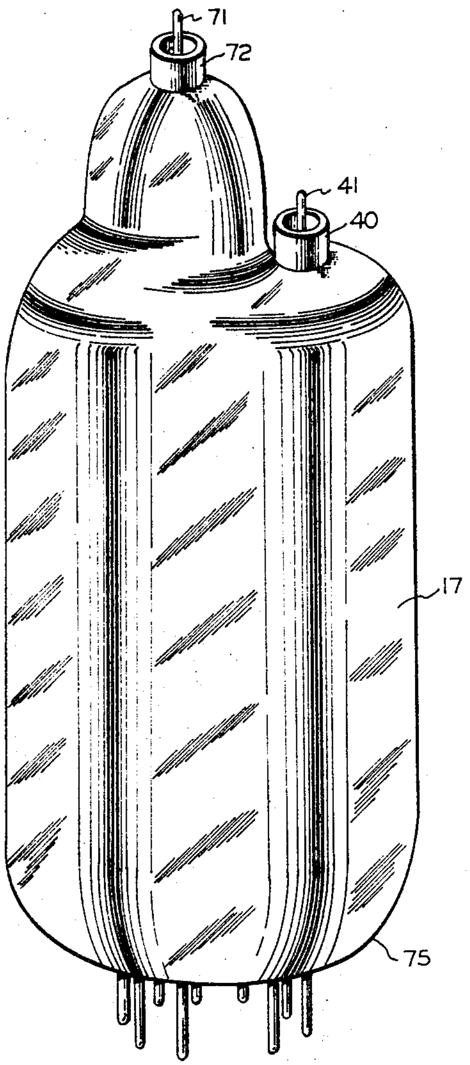
FIGURE 5 is an example of an envelope structure for a higher voltage model of the tube of FIGURE 3.

Essentially the same circuit as that shown in FIGURE 1 may be utilized at considerably higher voltages, if heater 41 is separated from heater 18. One terminal of heater 41 may be connected to cathode 42, which connects to anode 23 and to tube terminal 40. Terminal 40 and also the lead from heater 41 may be brought out the top of envelope 17 separately from the higher voltage terminals 71 and 72, as shown in FIGURE 5 at coaxial terminals 40 and 73. Under these circumstances, the peak pulse level upon anode 23, and cathode 42 may be increased to at least 7 or 8 kv. The high voltage output may be at least 20 kv.

The winding 31 of transformer 67 supplies amplified horizontal deflection current to the deflection yoke 34 of the cathode ray tube in a conventional manner, such as that shown. The deflection coils 34 are normally fastened about the neck of cathode ray picture tube 60, to deflect the electron beam in the horizontal direction.

Reference is made to my copending United States patent application Ser. No. 298,052, filed July 29, 1963, now abandoned, entitled "Electron Beam Deflection Circuit and Tubes," which shows a somewhat similar schematic (FIGURE 1) to FIGURE 1 of this application. This invention is an improvement upon that invention, for applications in which neither a separate focussing voltage rectifier nor a high voltage regulator is required. The major object of the present invention is to reduce costs to a bare minimum, while still securing the basic functions of furnishing a sawtooth deflection current to the horizontal deflection windings 34, and furnishing high voltage DC to the final anode 58 of the cathode ray picture tube 60.

As used in the appended claims, the "first cathode" is marked 19, in FIGURE 1, the "first anode" is marked 23, the "second cathode" is marked 48, the "third cathode" is marked 42, and the "second anode" is marked 43.

I claim to have invented:

1. An energizing system for a cathode ray tube having an anode and a cathode comprising a transformer having at least two windings, a tube having a first cathode, a control grid, a first anode and a second cathode, both said cathodes feeding electrons to said anode and said control grid comprising means controlling the flow of electrons from the first cathode to said first anode, means applying a varying deflection potential to said control grid, a first circuit including the first cathode and first anode and including means for applying the deflection potential in amplified form to said transformer, a second circuit and including means for applying potential to the anode of the cathode ray tube extending from the cathode of the cathode ray tube through one of said windings to said first anode of said tube thence to the second cathode of said tube thence through another of said windings, and thence to the anode of the catohde ray tube, and horizontal deflection means for said cathode ray tube, and means to energize the horizontal deflection means from said transformer.

2. An energizing system for a cathode ray tube as defined in claim 1 including power supply means included in both the first and second circuits.

3. An energizing circuit for a cathode ray tube as defined in claim 1 in which said tube also includes a third cathode connected to said anode and further includes a second anode in electron receiving relation to said third cathode, and damping circuit means connecting the third cathode and second anode across at least part of a winding of said transformer to damp oscillations therein.

4. An energizing circuit for a cathode ray tube having an anode and a cathode comprising a transformer having winding means; a tube having an envelope together with the following electrodes in the envelope, a first anode, a first cathode feeding said first anode, a control grid intervening between the first cathode and first anode, a second cathode feeding electrons to said first anode, a second anode, and a third cathode from which electrons pass to the second anode; means for applying a varying deflection potential to said control grid; a first circuit including said first cathode, said first anode and at least part of said winding means of said transformer; a second circuit including at least part of said winding means, the first anode, the second cathode, and the anode and cathode of the cathode ray tube for applying anode potential to the cathode ray tube; a damping circuit including at least part of said winding means, said second anode and said third cathode; and horizontal beam deflection means connected across at least a portion of the winding means of said transformer.

5. An energizing circuit for a cathode ray tube as defined in claim 4 in which said damping circuit includes damping reactance.

6. An energizing circuit as defined in claim 4 in which said damping circuit includes a condenser in series with said winding means.

7. An energizing circuit for a cathode ray tube as defined in claim 6 in which said damping circuit also includes an inductor in series with said winding means.

8. An energizing circuit as defined in claim 7 in which said damping circuit includes a condenser shunted across the third cathode and second anode.

9. An energizing system as defined in claim 4 having power supply means in said first and second circuits.

10. An energizing system as defined in claim 4, said second cathode having a heater, and a winding on said transformer for energizing said heater.

11. In combination with a cathode ray tube having an anode, a cathode, and horizontal deflection means; a transformer having winding means; a source of horizontal deflection voltage; and means, including a vacuum tube, for amplifying said horizontal deflection voltage and applying it to at least part of said winding means; said tube including an anode and a cathode connected across at least part of said winding means to act as a damping circuit; said winding means feeding said horizontal deflection means; said tube also including in said envelope a rectifier including said last-named anode and a cathode, and a circuit for energizing the anode and cathode of the cathode ray tube comprising a connection from the point on said winding means that attains the highest voltage above ground to the anode of the cathode ray tube, a connection from a point on the winding means that attains a lesser voltage above ground than said highest voltage point to the cathode of the rectifier, and means connecting the anode of the rectifier to ground and holding it at a potential with reference to ground that is small as compared with that of the anode of the cathode ray tube.

12. In combination with a cathode ray tube having an anode and horizontal deflection means; a transformer having winding means; a source of horizontal deflection potential; means for amplifying said potential and applying it to said winding means including a vacuum tube, said vacuum tube including an anode connected to a point on said winding means which point attains a maximum potential that is below that of the highest potential point of the winding means and also including a cathode from which electrons pass to said anode; a high voltage connection directly from the point on the winding means that attains the highest potential to the anode of said cathode ray tube; the anode and cathode of said vacuum tube being connected on the opposite side of the said winding means from the anode and cathode of the cathode ray tube; means to energize horizontal deflection means by at least part of said winding means.

13. In combination with a cathode ray tube having an anode and also having horizontal deflection means; a transformer having winding means; a source of horizontal deflection voltage; means for amplifying said horizontal deflection voltage and applying it to at least a part of said winding means; rectifier means having positive and negative electrodes; and circuit means extending from ground to said negative electrode through the rectifier thence from said positive electrode to a point on the winding means of lesser potential than at the point of maximum potential, thence through the winding means to the point of maximum potential thereof and thence to the anode of the cathode ray tube; whereby the rectifier means is on the low voltage side of the winding means.

References Cited

UNITED STATES PATENTS 2,813,225 11/1957 Dietch ---------------- 315—22

OTHER REFERENCES

RCA Receiving Tube Manual, 1950, p. 189.

RODNEY D. BENNETT, *Primary Examiner.*

J. G. BAXTER, *Assistant Examiner.*